F. G. JOHNSON.
REVERSE GEARING.
APPLICATION FILED APR. 1, 1908.
920,065.
Patented Apr. 27, 1909.
3 SHEETS—SHEET 3.
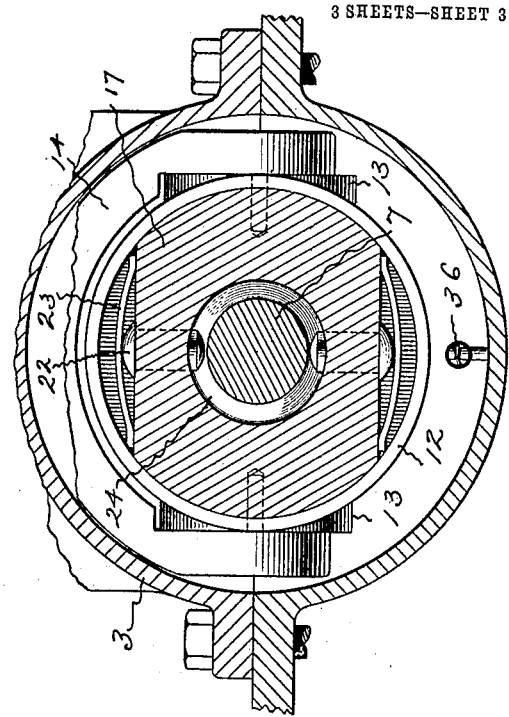
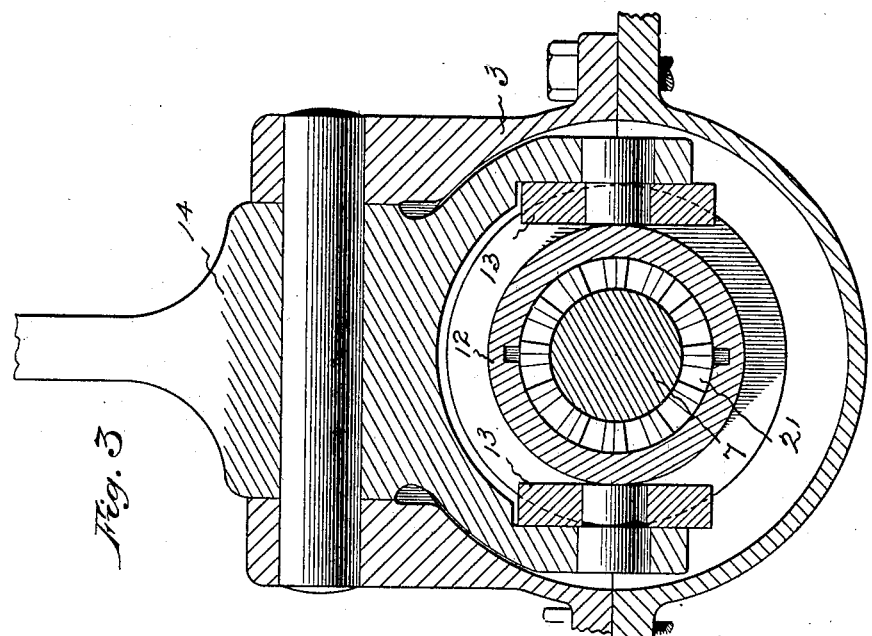

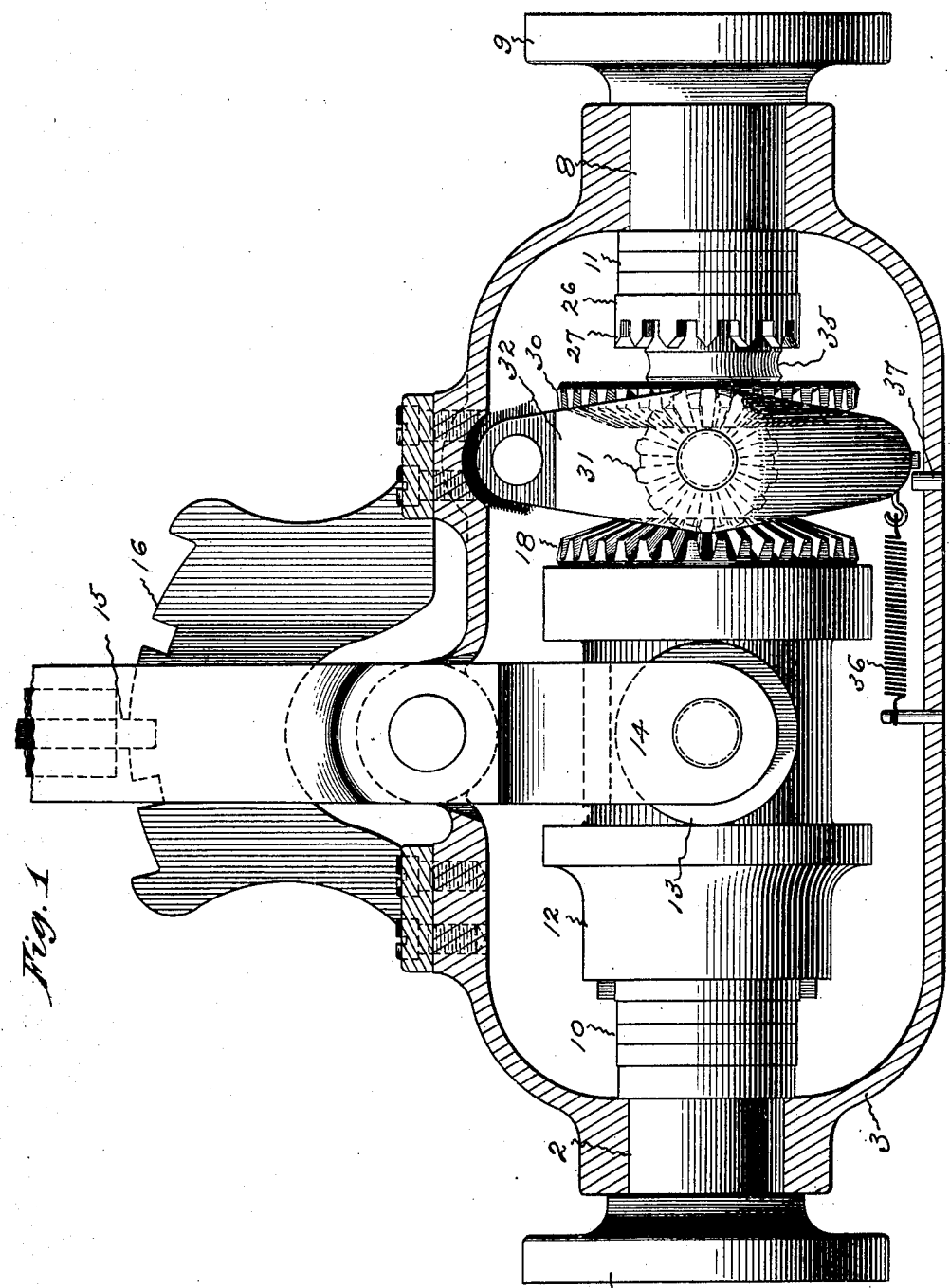

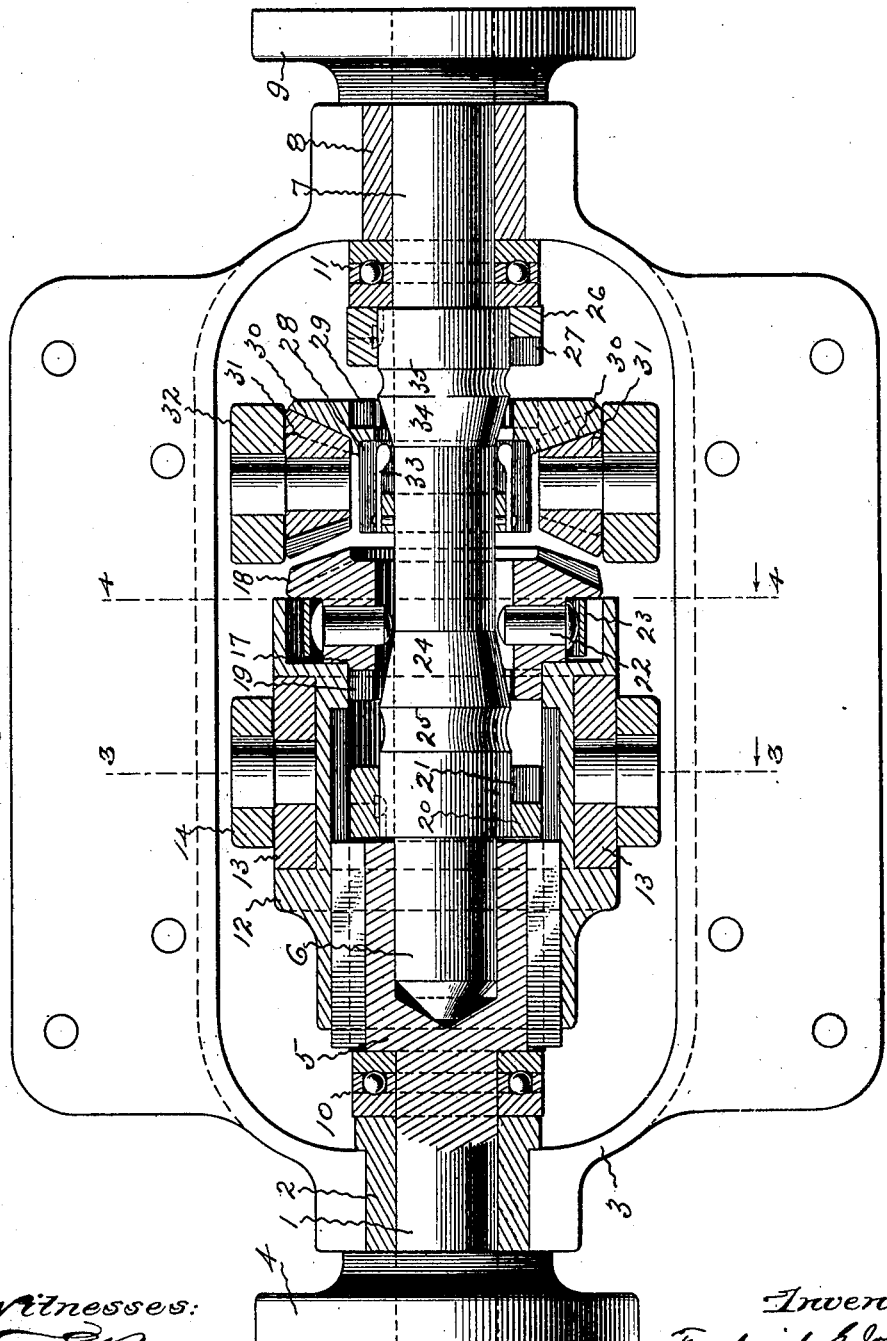

UNITED STATES PATENT OFFICE.

FREDERICK G. JOHNSON, OF HARTFORD, CONNECTICUT, ASSIGNOR TO THE EUREKA REVERSE GEAR COMPANY, OF HARTFORD, CONNECTICUT, A CORPORATION OF CONNECTICUT.

REVERSE-GEARING.

No. 920,065.  Specification of Letters Patent.  Patented April 27, 1909.

Application filed April 1, 1908. Serial No. 424,605.

*To all whom it may concern:*

Be it known that I, FREDERICK G. JOHNSON, a citizen of the United States, residing at Hartford, in the county of Hartford and State of Connecticut, have invented a new and useful Improvement in Reverse-Gearing, of which the following is a specification.

This invention relates to the class of apparatus designed for changing the direction of rotation of a driven shaft without changing the direction of rotation of the driving shaft, such as are provided for motor driven boats and other vehicles.

The object of the invention is to produce a very simple, strong and durable apparatus of this nature, which is so constructed that the parts are connected positively when set for driving forwardly and backwardly, but are connected frictionally while being shifted in either direction for the purpose of engaging the parts for driving forwardly and backwardly, in order that the load may be picked up and the driven shaft started in the desired direction before the parts are positively engaged, thus preventing shock and eliminating the possibility of damage to or breakage of the parts.

Figure 1 of the accompanying drawings shows a side elevation of an apparatus which embodies the invention, with the casing cut in central vertical section. Fig. 2 shows a horizontal central section. Fig. 3 shows a vertical transverse section on the plane indicated by the dotted line 3—3 on Fig. 2, and Fig. 4 shows a similar section on the plane indicated by the dotted line 4—4 on Fig. 2.

The shaft section 1 is supported by the bushing 2 in one end of the casing 3 and has a flange 4 that is designed to be bolted or otherwise fastened to the driving shaft. This shaft section has a hub 5, into which projects the end 6 of the shaft section 7 that is supported by the bushing 8 in the other end of the casing, and that is provided with a flange 9, which is designed to be bolted or otherwise fastened to the driven shaft. A thrust bearing 10 is arranged between the hub of the driving shaft and its supporting bushing, and a thrust bearing 11 is arranged between a shoulder on the driven shaft and its supporting bearing at the other end of the casing. Splined upon the hub of the driving shaft, so that it rotates therewith, but has a movement longitudinal thereof, is a sleeve 12. This sleeve is adapted to be moved back and forth by means of rolls 13 on the lower end of the lever 14, which is pivoted to the casing, and is adapted to be held in its several positions by means of the catch 15 and notched segment 16, that is secured to the top of the casing. Fastened in the end of the sleeve and sliding therewith, is a block 17 which on its outer face has a bevel gear 18, and on its inner face has a positive clutch part 19.

The driven shaft is enlarged or provided with a collar 20 having a positive clutch part 21. When the sleeve is moved to its limit in one direction, the teeth of the clutch part 19 which it carries, mesh with the teeth of the clutch part 21 on the collar secured to the driven shaft so that the parts become positively clutched and are rotated as one piece.

In the block 17 that is fastened in the sleeve, and has the bevel gear and clutch part, are studs 22, which are normally thrust toward the axis of the driven shaft by stiff springs 23. These studs, when the sleeve is moved in the direction just mentioned, ride up on the tapering surface 24 of the driven shaft before the clutch parts are engaged, in such manner as to cause the sleeve and the driven shaft to be frictionally clutched and the rotation of the driving shaft be communicated to the driven shaft by the frictional grip of the studs before the clutch teeth positively connect the shaft parts. When the clutch teeth are engaged, these studs project into the groove 25 in the driven shaft and retain the parts in this condition until they are moved by the lever.

Fastened on the driven shaft is a collar 26 with a positive clutch part 27 and movable longitudinally on the driven shaft is a sleeve 28 that has a positive clutch part 29, designed to be engaged with the clutch part on the collar fastened to the driven shaft. The sleeve 28 also has a bevel gear 30 which meshes with the bevel pinions 31 that are mounted in the yoke 32 which is pivoted to the casing. In mortises in the sleeve 28 of the form shown are stiff springs 33 which, when this sleeve is moved for the purpose of engaging its clutch teeth with the teeth of the clutch on the driven shaft, ride up on the tapering surface 34, of the driven shaft to the groove 35, and frictionally clutch the sleeve with the driven shaft so they will rotate together, and the rotation of the driven shaft will be commenced in the desired direction before the clutch teeth positively connect the parts.

When the lever is thrown for causing the driven shaft to be rotated forwardly and the sleeve 12 is moved the studs first clutch the parts, so that the driven shaft will be started forwardly, that is, in the same direction as the driving shaft. Continued movement of the sleeve in this direction finally brings the clutch in the sleeve into engagement with the clutch teeth of the collar 20 on the driven shaft, and then the driving shaft becomes positively joined with the driven shaft, which is already rotating in the same direction. When the lever is moved in the opposite direction for reversing the direction of rotation of the driven shaft, the bevel gear 18 connected with the sleeve 12 is engaged with the pinions 31 that mesh with the gear 30 and cause the sleeve 28 to rotate reversely. The continued movement of the lever causes the gears and pinions to slide the sleeve 28 so that the springs 33 will ride up on the tapering portion of the shaft and start the reverse rotation of the shaft, the pinion yoke swinging so as to permit this movement. When the lever is swung to its backward limit, the clutch teeth on the sleeve 28 engage the clutch teeth on the collar 26 and clutch the parts positively so that the rotation of the driven shaft in the reverse direction, which was started by the frictional grip of the springs, will be continued by a positive drive. When the lever is in its neutral position, none of the parts are engaged so that the rotation of the driving shaft will not be communicated to the driven shaft.

A spring 36 is attached to the lower end of the swinging yoke carrying the bevel pinions so as to draw the pinions and the reversing gear away from the reversing clutch on the driven shaft when the lever is not in its reverse position. A stud 37 is arranged in the case to prevent the spring from pulling the yoke too far.

The invention claimed is:

1. A reverse gearing having a driving shaft and a driven shaft, a longitudinally movable sleeve rotarily connected with the driving shaft, means for moving the sleeve longitudinally, means carried by the sleeve for connecting it frictionally with the driven shaft, means carried by the sleeve for connecting it positively with the driven shaft, a gear rotatable with the sleeve, reversing pinions and a reversing gear adapted to be driven by the sleeve gear, and means for connecting the reversing gear with the driven shaft, substantially as specified.

2. A reverse gearing having a driving shaft and a driven shaft, a sleeve rotarily connected with and longitudinally movable upon the driving shaft, means for moving the sleeve longitudinally, means carried by the sleeve for frictionally connecting it with the driven shaft, means carried by the sleeve for positively connecting it with the driven shaft, a bevel gear carried by the sleeve, pinions adapted to be engaged by the bevel gear, a movable yoke supporting the pinions, a reversing gear adapted to be rotated by the pinions, means for connecting the reversing gear with the driven shaft frictionally, and means for connecting the reversing gear with the driven shaft positively, substantially as specified.

FREDERICK G. JOHNSON.

Witnesses:
HARRY R. WILLIAMS,
F. A. SAUNDERS.